United States Patent [19]
Kawamata et al.

[11] 3,862,354
[45] Jan. 21, 1975

[54] TUNING INDICATION CIRCUIT "OPERATING DEVICE" FOR TELEVISION RECEIVERS

[75] Inventors: Yukio Kawamata, Ibaragi; Keisuke Yamamoto, Hirakata; Toshimitsu Fujimori, Ibaragi, all of Japan

[73] Assignee: Matsushita Electric Industrial Co., Ltd., Osaka, Japan

[22] Filed: June 4, 1973

[21] Appl. No.: 366,512

Related U.S. Application Data

[63] Continuation of Ser. No. 186,755, Oct. 5, 1971, which is a continuation of Ser. No. 850,887, Aug. 18, 1969, abandoned.

[30] Foreign Application Priority Data

| | | |
|---|---|---|
| Aug. 22, 1968 | Japan | 43-60652 |
| Oct. 24, 1968 | Japan | 43-77485 |
| Nov. 13, 1968 | Japan | 43-84110 |
| Feb. 27, 1969 | Japan | 44-15992 |
| Oct. 30, 1968 | Japan | 43-95346 |
| Oct. 30, 1968 | Japan | 43-95347 |
| Nov. 18, 1968 | Japan | 43-101205 |
| Dec. 26, 1968 | Japan | 43-1001 |
| Feb. 27, 1969 | Japan | 44-18912 |
| May 23, 1969 | Japan | 44-49145 |
| June 25, 1969 | Japan | 44-61370 |

[52] U.S. Cl... 178/5.8 R, 178/DIG. 15, 200/DIG. 2, 325/455

[51] Int. Cl. .......... H04n 5/50

[58] Field of Search..... 178/5.8 R, 5.8 AF, DIG. 15; 200/DIG. 1, DIG. 2; 317/DIG. 2, 146; 325/399, 455; 340/258 B, 258 C

[56] References Cited

UNITED STATES PATENTS

| | | | |
|---|---|---|---|
| 2,743,433 | 4/1956 | Parmet | 340/258 C |
| 3,436,475 | 4/1969 | Zimmerman et al. | 178/7.5 R |
| 3,492,440 | 1/1970 | Cerbone et al. | 317/DIG. 2 |
| 3,497,615 | 2/1970 | Kent et al. | 178/7.3 R |

*Primary Examiner*—Robert L. Griffin
*Assistant Examiner*—George G. Stellar
*Attorney, Agent, or Firm*—Stevens, Davis, Miller & Mosher

[57] ABSTRACT

A tuning indication circuit operating device for television receivers including a high frequency signal generating means, a switching circuit means responsive to the high frequency signal output for controlling the operation of a tuning indication controlling circuit, and a contactor forming part of a tuning adjustment knob and connected to the junction point between the high frequency generating means and the switching circuit means. When the contactor is touched with a band, the capacitance of the human body composes an imparting circuit for the output voltage of the high frequency signal generator means, and this imparted signal voltage is utilized to control the switching circuit means so as to render the tuning indication circuit operative, thereby to produce a tuning indication on the picture tube screen only when the adjustment knob is touched.

3 Claims, 17 Drawing Figures

Y. KAWAMATA, K. YAMAMOTO AND T. FUJIMORI INVENTORS

BY Stevens, Davis, Miller & Mosher ATTORNEYS

BY

TUNING INDICATION CIRCUIT "OPERATING DEVICE" FOR TELEVISION RECEIVERS

This application is a continuation of Ser. No. 186,755 filed Oct. 5, 1971 which is a continuation of Ser. No. 850,887 filed Aug. 18, 1969, (now abandoned).

This invention relates to a switching device utilizing the capacitance of a human body. This invention will be described hereinbelow by way of example as embodied in a tuning indicator circuit for television receivers.

In television receivers, especially in color television receivers, it is essential that accurate tuning be achieved in order to produce a high quality picture. To this end, it has been the practice to provide tuning indicator means in a television receiver. Among the tuning indicator means presently in extensive use is one using a magic eye to produce the tuning indication and one which produces a pattern representing a tuning indication on the picture tube screen of the television receiver, for example.

Not only in the case of the latter but also in the former case, it is desired that the tuning indication signal supplied to the magic eye or the like become extinct upon completion of the tuning adjustment. More specifically, this is required in order to increase the life span of the magic eye in the case of the former one and in order to avoid eyestrain which the tuning indication signal may produce if it is displayed on the screen even after the adjustment is over in the case of the latter one. To meet such requirement, the design should be made such that the magic eye or the like is not operated in the normal state but only during the tuning adjustment. In an attempt to effect the tuning adjustment, therefore, the switch should first be turned on to make the indicator such as the magic eye or the like ready for operation and thereafter the tuning adjustment knob should be rotated for adjustment. That is, two types of operation such as the one to turn on the switch and the one to rotate the knob are required, so that the operation becomes complex.

Accordingly, it is an object of the present invention to make a switching circuit perform a switching operation merely by a contactor being touched by the operator's hand.

Another object of the present invention is to provide a concrete circuit arrangement capable of achieving the foregoing object.

A further object of the present invention is to provide means which can be applied as a tuning indicator means for a television receiver.

A still further object of the present invention is to solve various problems which may arise when the present invention is applied to a tuning indicator circuit for a television receiver, namely, to make it possible to easily obtain a high frequency signal, avoid the adverse effect of an external disturbing wave and prevent any spurious radiation from being emitted through the body of the operator.

The present invention will now be described as embodied in tuning indicator circuits for a television receiver with reference to the accompanying drawings. In the description in conjunction with the drawings, the contactor is expressed as a switch.

Figure 1:
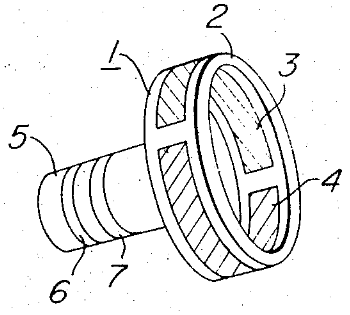
FIG. 1 is a perspective view showing a contactor employed in the present invention.

Referring to FIG. 1, there is shown a knob 1 provided with an operating portion 2 having a pair of opposing arcuate electrodes 3 and 4 fitted therein. The electrodes 3 and 4 are electrically connected with terminals 6 and 7 provided on a shaft 5, respectively. In FIG. 1, oblique lines indicate that the electrodes 3 and 4 are embedded in the knob 1.

If the operating portion 2 is touched by a hand, then a capacitance will be formed therebetween. The electrodes 3 and 4 are connected in parallel with a parallel circuits of tuning circuit elements such as a capacitor 8 and inductor 9 of an oscillator circuit, as shown in FIG. 2.

Figure 2:
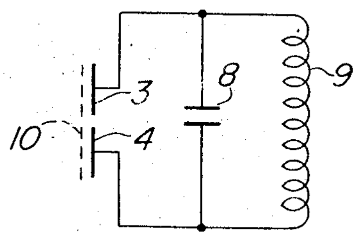
FIG. 2 is a circuit diagram of said contactor.

In FIG. 2, broken line 10 indicates the human hand. If the oscillation frequency of the oscillator circuit varies, then a relay is actuated to operate the tuning indicator circuit, thus producing a tuning indication.

The oscillation frequency of the aforementioned oscillator circuit is changed by touching the operating portion of the said knob 1 with a hand, and thereupon the tuning indicator circuit is operated so that a tuned state is achieved through rotation of the knob. When such a tuned state is attained, the oscillator is stopped from operation so that the tuning indicator circuit is also stopped from operation.

As described above, when the knob is touched with the hand the capacitance is changed so that the tuning indicator circuit is rendered operative, while when the knob is set free the tuning indicator circuit is stopped from operating. Therefore, in the case of a tuning indicator means using a magic eye, the life span of the magic eye is increased because it is not always lit, and in the case of means of the type in which a tuning indication is produced on the picture tube screen, such indication is produced only during adjustment, which constitutes a practical advantage.

In the foregoing knob construction, use is made of a capacitance which is established between the electrodes and the hand when the knob is touched. However, it is also possible to use the capacitance of a human body inserted between the knob and the ground when the knob is touched. An example of such an arrangement will now be described with reference to the drawings.

Figure 3:
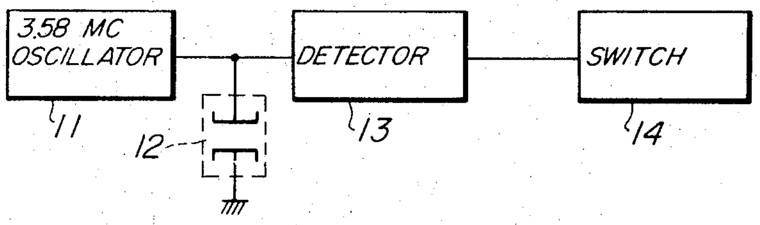
FIG. 3 is a block diagram showing the switching device according to an embodiment of the present invention.

Description will first be made of the principles shown in FIG. 3, wherein a continuous wave of 3.58 MC taken from a 3.58 MC oscillator circuit 11 is passed to the ground through a switch indicated at 12. If the switch 12 is touched with a hand, this corresponds to the case where a capacitor of about 30 to 50 PF is connected across the switch 12. Therefore, if the impedance of the oscillator circuit 11 is high, then substantially no input is imparted to a detector circuit 13, so that no voltage is applied to a switch 14. This switch 14 is connected in series or parallel with a circuit which is to be opened or closed. In this way, the tuning indicator circuit is rendered operative when the switch 12 is touched with a hand, and it is rendered non-operative when the switch 12 is set free. The aforementioned switch 12, which is normally in the open state, is short-circuited through the capacitance of the hand when it is touched with the latter. The switch 12 is contained in a tuning adjustment knob of the tuning indicator circuit, so that adjustment can be affected by rotating the knob while touching it with the hand. During such adjustment, the switch 12 is short-circuited so that the tuning indicator circuit is in the on state.

Description will next be made of the circuit shown in FIG. 4 which is an example of FIG. 3, wherein numeral 11 represents a 3.58 MC oscillator, 15 a transformer thereof, 16 a capacitor having one end thereof connected with the secondary winding of the transformer, and 12 the aforementioned switch having one end thereof grounded and the other end thereof connected with the other end of the capacitor 16 and also with the base of a transistor 17. A resistor 18 is inserted between the base of the transistor 17 and the ground. The collector of the transistor 17 has a DC voltage of $+B_1$ applied thereto, and the emitter thereof is grounded through a resistor 19 and connected with the base of a transistor 21 through a resistor 20. The emitter of the transistor 21 is grounded, and the collector thereof has a DC voltage of $+B_2$ applied thereto and is connected with a power source voltage input terminal of a tuning indicator circuit 23.

The secondary winding of the transformer 15 which is connected with the sub-carrier wave (3.58 MC) oscillator 11 is grounded through the capacitor 16 and switch 12. A capacitance value of about 10 PF is enough for the capacitor, and there is no danger of electric shock when one touches the switch 12.

If the switch 12 is touched with a hand, then the 3.58 MC component existing at the connection between the capacitor 16 and the switch 12 will be reduced down to several per cent of that when the switch 12 is not touched. Assume now that the value of the capacitor 16 is 5.0 PF, and that the capacitance of the switch 12 when it is touched is 40 PF. Now, when the switch 12 is not touched an input of 1.0 $V_{p-p}$ is imparted to the base of the transistor 17. This input is subjected to base-detection in the transistor 17, and since the latter constitutes an emitter-follower circuit, it provides at the emitter thereof a DC voltage of 1.0 V which is sufficient to saturate the transistor 21. Thus, the transistor 21 is saturated so that the collector potential easily becomes substantially equal to the ground potential since the collector is connected with as high a voltage as $+B_2$(270 V).

This operation results in the input terminal of the tuning indicator circuit 23 being grounded so that the tuning indicator circuit does not operate. If the switch 12 is touched with a hand, then the 3.58 MC input component imparted to the transistor 17 is reduced down to $1\ V \times 5.0/40 + 5.0 \div 0.11\ V$ so that the transistor 17 is rendered non-conductive. At this point, the transistor 21 is also rendered non-conductive. That is, the situation is as if the transistor 21 were not connected. Thus, the voltage $+B_2$ is applied to the tuning indicator circuit 23 through a resistor 22 so that a tuning indication pattern is produced on the picture tube screen. The knob of the switch 12 serves to adjust the local oscillation frequency. Therefore, the tuning indicator circuit is operated while the switch 12 is touched and it is quickly rendered nonoperative when the switch is set free.

The example shown in FIG. 5 will be described, wherein a diode 24 is connected between the capacitor 16 and the base of the transistor 21 in place of the transistor 17 of FIG. 6, a series circuit of a capacitor 25 and DC power source 26 is inserted between the base of the transistor 21 and the ground, a resistor 27 is connected in parallel with the capacitor 25, and a resistor 28 is inserted between the anode of the diode 24 and the negative electrode of the DC power source 26. Description will next be made of the operation of this circuit. The 3.58 MC component available from the CW oscillator 11 substantially does not appear at the connection point between capacitor 16 and the switch 12 when the latter is touched with a hand, and it is increased when the switch 12 is set free. This 3.58 MC component is detected and smoothed out by the diode 24 and capacitor 25, and then it is imparted to the base of the transistor 21. Assume now that the amplitude of the 3.58 MC component when the switch 12 is set free is $V_{op\text{-}p}$. Then, the DC voltage applied to the transistor 21 will become $(V_{op\text{-}p}/2 - Ec)$. Furthermore, assume that the 3.58 MC components at the connection between the capacitor 16 and the switch 12 is $V_{sp\text{-}p}$ when the switch 12 is touched. Then, the DC voltage imparted to the transistor 21 will become $(V_{sp\text{-}p}/2 - Ec)$. Generally, $V_{op\text{-}p} > 10V_{sp\text{-}p}$. Thus, it is possible to improve the switching performance of the transistor 21 by adding $-E_c$. Then circuit of FIG. 5 operates similarly to that of FIG. 4 in the other respects. The feature of this circuit resides in that it operates in the same manner as that of FIG. 4, although there is provided a single transistor.

Figure 4:
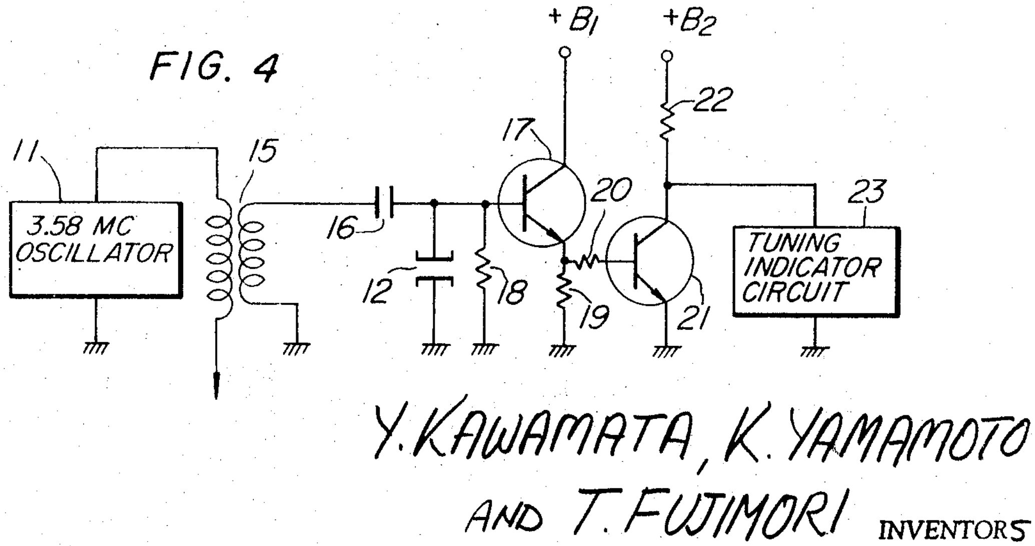
FIGS. 4 to 10 are circuit diagrams showing examples of the switching device embodying the present invention, respectively.
Figure 5:
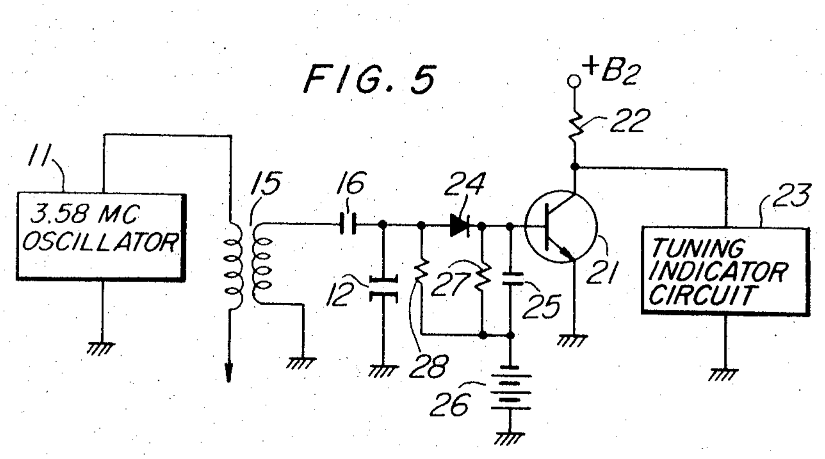

By setting the resonance frequency of a resonant circuit constituted by connecting an inductance in parallel with the switch 12 in FIG. 4 to the CW oscillation frequency, it is possible to enable a switching circuit provided at the next stage to be quickly operated.

With the foregoing arrangements, the high frequency signal in use can be sufficiently passed to the ground through the capacitance (low capacitance) of the human hand, and the tuning indicator circuit can be satisfactorily on-off controlled. Furthermore, the operation is very simple since the tuning indicator circuit is rendered operative merely by gripping the knob for ajustment.

Figure 6:
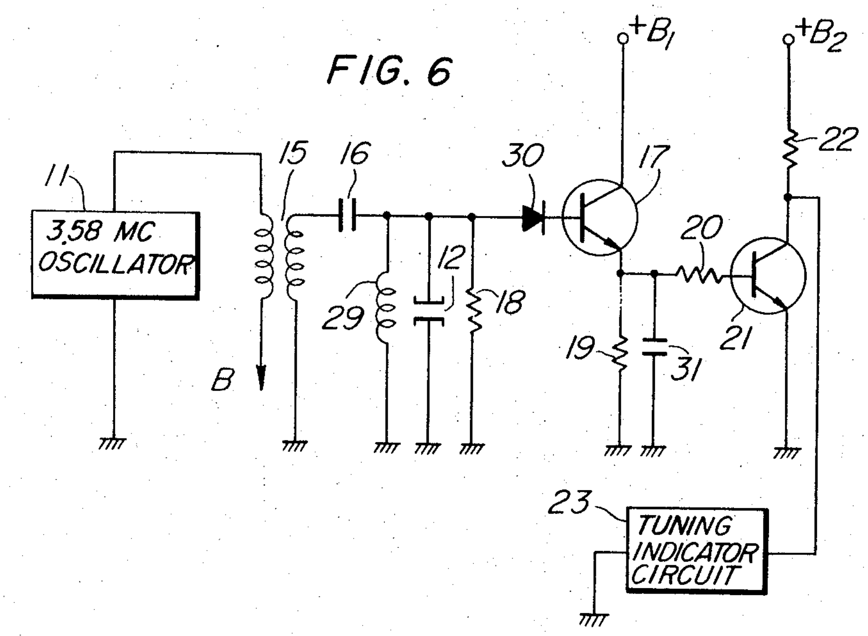

FIG. 6 shows an example wherein an inductance is connected in parallel with the switch 12 as described above. Numeral 29 represents the inductance which constitutes a tuning circuit with the capacitance of the switch 12 and which is adapted to resonate at 3.58 MHz when the switch 12 is not touched. If the switch 12 is touched, its capacitance is changed so that the resonance point of the tuning circuit is shifted from 3.58 MHz. In this case, it is possible to make the signal passed to the succeeding detector diode substantially nill. Numeral 31*a* denotes a capacitor inserted between the emitter of the transistor 17 and the ground.

Figure 7:
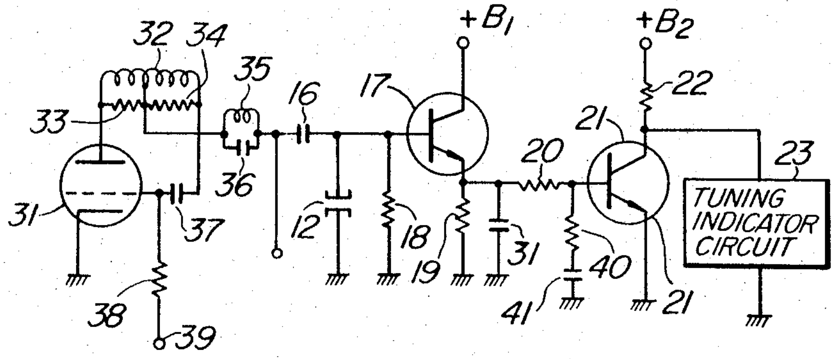

Description will now be made of an example wherein as a control signal, use is made of 15.75 KHz which is the plate output of a horizontal oscillator tube. In FIG. 7 numeral 31 represents the horizontal oscillator tube having a parallel circuit of a coil 32 and resistors 33 and 34 provided in the plate circuit thereof. A saw-tooth waveform signal is available from the parallel circuit, and it is passed to the capacitor 16 through a parallel circuit of a coil 35 and capacitor 36. Numeral 37 indicates a capacitor inserted between the grid of the oscillator tube 31 and one end of the aforementioned coil 32, and 38 a resistor provided for the purpose of applying an AFC voltage from a terminal 39 to the grid of the oscillator tube 31. Numerals 40 and 41 represent a resistor and DC power source for providing a base bias to the transistor 21 respectively. The switch 12 of this circuit is in the open state when not touched, and when it is touched, its capacitance of 30 pF to 50 pF is added to the circuit. This circuit is adapted to operate in the same manner as the foregoing circuits, except that the output of the horizontal oscillator circuit is used as a control signal. This control signal is a high frequency signal, and therefore the capacitors of this circuit may be of low capacitance. This circuit can be effectively applied to a television receiver in which such a signal can be easily obtained.

Figure 8:
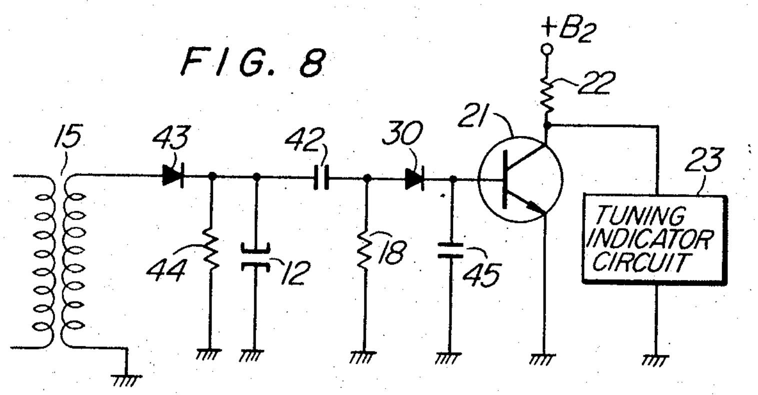

However, there is the possibility that the 3.58 MC signal is leaked to the outside through the human body when the switch 12 is touched with the hand. Means for preventing this will be described below. FIG. 8 shows an example of such means, wherein a rectifier diode is inserted between the secondary winding of the transformer 15 of the 3.58 MC oscillator and a capacitor 42, and a parallel circuit of a resistor 44 and switch 12 is inserted between the cathode of the rectifier 43 and the ground. The other end of the capacitor 42 is connected with the base of the transistor 21 through the detector diode 30. Numeral 45 indicates a capacitor inserted between the base of the transistor 21 and the ground. Description will now be made of the operation of this circuit. When the switch 12 is not touched with the hand, the 3.58 MHz AC signal available from the oscillator transformer is rectified by the diode 43 and then appears across the resistor 44 and across the switch 12. The DC component of the rectified signal is blocked by the capacitor 42, and only the AC component thereof is further rectified by the diode 30 so as to be applied across a capacitor 45. As the voltage across the capacitor 45 builds up, the transistor 21 is rendered conductive to be saturated. As a result, the tuning indicator means 23 is substantially short-circuited by the transistor 21 so that power supply thereto is interrupted. At this point, therefore, the tuning indicator means 23 is rendered non-operative. If the switch 12 is touched with the hand, this equivalent to the case where a capacitor of about 30 to 50 pF is connected thereto. Thus, the cathode of the diode 43 is grounded through the resistor 44 and capacitance of the switch 12. Consequently, the AC signal rectified by the diode is smoothed out to be converted to a DC signal by the resistor 44 and capacitance of the switch 12. Only a small amount of AC component contained in the DC signal thus smoothed out is permitted to pass through the capacitor 42, and therefore sufficient voltage to render the transistor 21 conductive is not obtained. Hence, the transistor 21 is switched to the non-conducting state. Since the power source voltage is imparted to the tuning indicator means 23 through the resistor 22, this means 23 is rendered operative. If the switch 12 is set free, then the transistor 21 is again rendered conductive so that the means 23 is stopped from operation. As described above, a capacitance of about 30 to 50 pF is equivalently connected with the switch 12 when the latter is touched with the hand, but in this case the output current from the diode 43 is smoothed out by this capacitance and resistor 44 so that a DC voltage appears across the contactor switch 12. Since this DC voltage is applied to the human body, there is no possibility that any spurious electromagnetic wave is radiated from the human body, so that no adverse effect on external equipment is produced.

Figure 9:
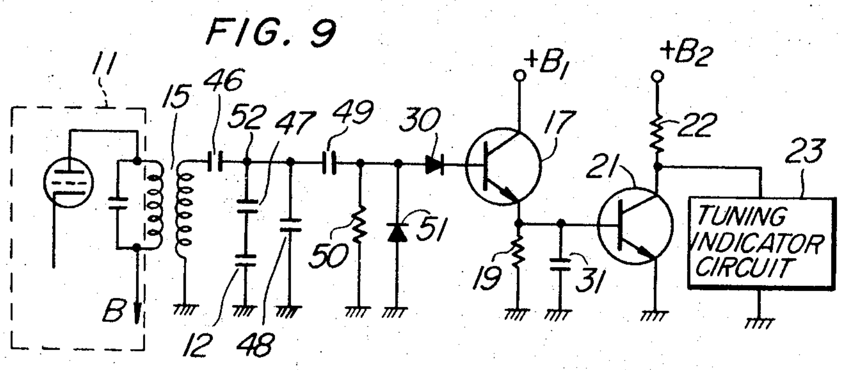

Another example of the means for preventing the radiation of spurious electromagnetic waves will be described with reference to FIG. 9, wherein the secondary winding of the transformer 15 has one end thereof grounded and the other end thereof connected with one end of a capacitor 46, and a series circuit of a capacitor 47 and switch 12 and a capacitor 48 are inserted between the other end of the capacitor 46 and the ground. Further, the other end of the capacitor 46 is connected with the anode of the diode 30 through a capacitor 49, and a parallel circuit of a resistor 50 and diode 51 is connected between the anode of the diode 30 and the ground in such a manner that a voltage doubler circuit is constituted by the two diodes 30 and 51. The cathode of the diode 30 is connected directly to the base of the switching transistor 17. The remaining circuit arrangement is identical with that of FIG. 6.

Description will now be made of the operation of this circuit. When the switch 12 is not touched with the hand, a high voltage occurs at the connection point 52 between the capacitors 46 and 47. This voltage is rectified to be doubled by the diodes 51 and 30 and is then imparted to the base of the transistor 17 to render the latter conductive, so that no B voltage is applied to the control circuit 23. On the other hand, when the switch 12 is touched with the hand, the capacitance thereof increases so that the voltage at the connection point 52 becomes low. Such a low voltage is insufficient to keep the transistor 17 conductive even if it is rectified to be double. Consequently, the transistor 21 is turned on so that the B voltage is imparted to the control circuit 23 to render the latter operative. Thus, by turning the tuning adjustment knob, it is possible to achieve accurate tuning while watching an indication produced on the picture tube screen. A critical problem here is that when the switch 12 is touched with the hand, the human body serves as an antenna to emit spurious radiation of the oscillation output of 3.58 MHz which in turn has an adverse effect on other circuits or equipment. Therefore, it is required that such unwanted radiation be minimized. The circuit shown in the drawing is adapted to solve this problem. The capacitance of a human body is approximately 50 pF, although there are slight individual differences. Assuming that the amplitude of the 3.58 MHz imparted to the switch 12 when the latter is touched with the hand is $V_s$, the quantity R(*db*) of unwanted radiation induced at the power source lines is experimentally $R = a \cdot V_s$. Further, assuming that the practical limit of the quantity R of spurious emission is 4 *db* and that the amplitude of the 3.58 MHz output occurring in the secondary winding of the transformer T is 30 $V_{p\text{-}p}$, then the value of the capacitor 46 becomes 2 pF. The capacitance 48 is about 15 pF which is a combination of the capacitance of the knob per se and those of the wiring and fittings, and this capacitance cannot be eliminated. If it is now assumed that the detection efficiency is 30 percent, then the voltages to turn on and off the transistor 17 are given as follows:

$30 \times 2/15 + 2 \times 0.3 = 1.1$ V .... in the case where the switch 12 is not touched.

$30 \times 2/50 + 15 + 2 \times 0.3 = 0.27$ V ... in the case where the switch 12 is touched.

Considering the case where the capacitance of the human body is lower than 50 pF, the transistor 17 should has a current amplification factor of the order of $10^4$ in order that it may perform sufficiently satisfactory switching operation with a voltage lower than the aforementioned values. For this reason, the transistors 17 and 21 should be connected with each other in the Darlington connection. As described above, with the foregoing arrangement, a voltage obtained by dividing a high frequency signal by means of capacitors is rectified to be doubled, and the rectified voltage is imparted to the base of the first stage one of the transistors connected in Darlington configuration so that the first stage transistor is enabled to satisfactorily perform switching operation merely by touching the switch with the hand. Furthermore, spurious emission which tends to be caused with the human body serving as an antenna can be restricted to a practically allowable extent.

Figures 10, 13, 14:
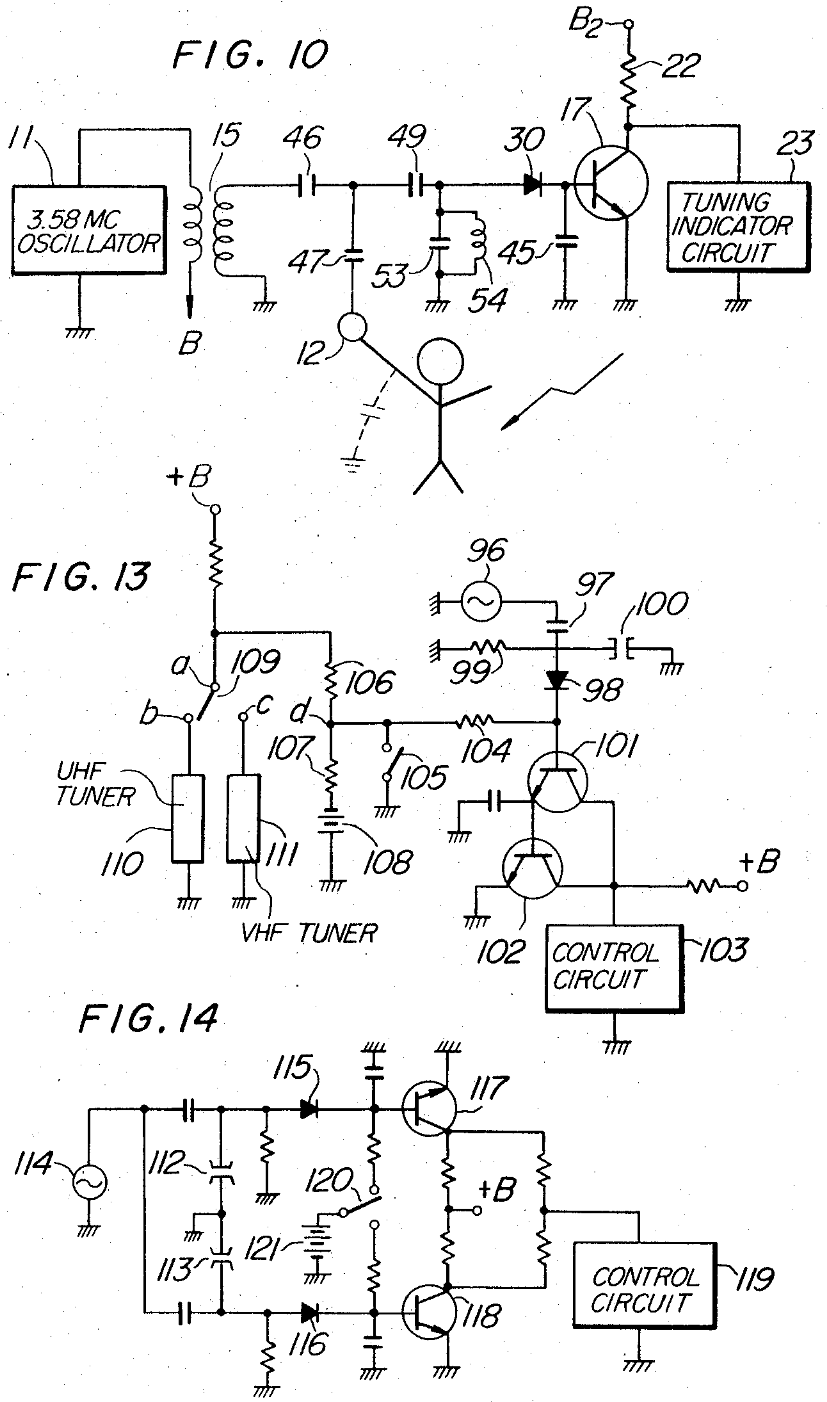
FIGS. 13 and 14 are circuit diagrams showing other examples of FIG. 11, respectively.

Description will now be made of means for preventing the transistor from being erroneously driven by an external disturbance wave which comes in through the human body when the switch 12 is touched and which is detected. FIG. 10 shows an example of such means, wherein a parallel circuit of a capacitor 53 and inductor 54 is interposed between the connection point between the capacitor 49 and the anode of the diode 30 and the ground. The resonance frequency of this parallel circuit is set to 3.58 MHz. Thus, this resonance circuit represents the maximum impedance with respect to 3.58 MHz, and by making its Q high, the impedance thereof becomes very low at other frequencies than 3.58 MHz. Thus, normal operation is performed at 3.58 MHz. At other frequencies than 3.58 MHz, however, no detection output is available. Therefore, the operation is not performed by any electromagnetic wave induced in the human body. Numeral 49 represents a small capacitance for preventing the resonance point from being shifted when the knob 12 is touched with the hand.

Next, description will be made of the relationship between the present circuit and an AFC circuit. Recently, it has been the usual practice to provide an AFC circuit in a television receiver to thereby automatically control the tuned frequency to the optimum one. Furthermore, there are provided a tuning adjustment means for manually adjusting the center frequency if it is shifted, and a tuning indicator circuit for indicating the tuned state. In this case, it is desirable that the tuning indicator circuit is rendered operative only in an attempt to effect tuning adjustment. This is because in the case where a magic eye is used to produce a tuning indication, the magic eye should not be lit all the time in view of the life span thereof and in the case where a tuning signal is produced on the picture tube itself, any tuning indication should not be produced in normal circumstances. On the other hand, the AFC circuit should be operating in normal circumstances, whereas when the tuned state is adjusted, it should not be operating.

Figure 11:
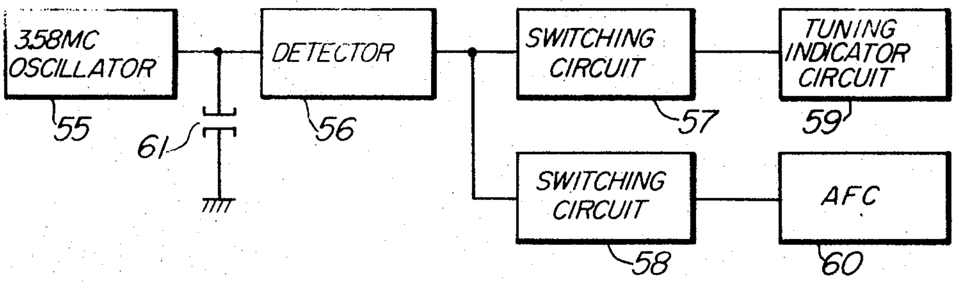
FIG. 11 is a block diagram showing a second embodiment of the present invention.

Tuning indicator means capable of meeting such requirements will be described with reference to FIGS. 11 and 12. In FIG. 11, numeral 55 represents 3.58 MC oscillator circuit (CW oscillator circuit), 56 a detector circuit, 57 and 58 switching circuits respectively, and 59 a tuning indicator circuit. Numeral 60 denotes an AFC circuit, and 61 a switch similar to the aforementioned switch 12. This switch 61, which is inserted between the output terminal of the CW oscillator circuit 55 and the ground, is normally in the open state, and it is adapted to operate so as to permit the output of the CW oscillator circuit 55 to be passed to the ground through the capacitance of the hand when it is touched by the hand. The switch 61 is contained in a adjustment knob of the tuning indicator circuit 59.

Figure 12:
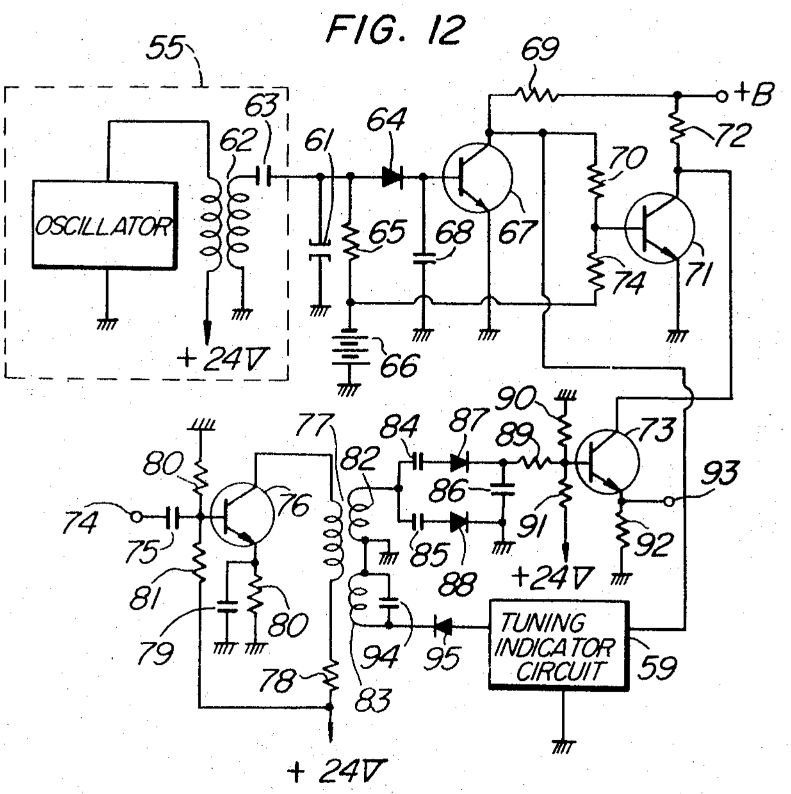
FIG. 12 is a circuit diagram showing a concrete example of FIG. 11.

FIG. 12 shows a concrete example of the circuit arrangement wherein the anode of a detector diode 64 is connected with the secondary winding of an output transformer 62 of the CW oscillator circuit 55 through a capacitor 63, the switching element 61 is inserted between the anode of the diode 64 and the ground, and a series circuit of a resistor 65 and DC power source 66 is connected in parallel with the switching element 61. Further, the cathode of the diode 64 is connected with the base of a switching transistor 67 and grounded through a capacitor 68. The aforementioned diode constitutes the detector circuit 56, and the transistor 67 forms the switching circuit 57. The emitter of the transistor 67 is grounded, and the collector thereof is connected with a +B power source through resistor 69, with the power source input terminal of the tuning indicator circuit 59 and with the base of a transistor 71 constituting the switching circuit 58 through a resistor 70. The emitter of the transistor 71 is grounded, and the collector thereof is connected with the +B power source through a resistor 72 and directly with the collector of a transistor 73 constituting the AFC circuit 60. Further, the base of the transistor 71 is connected with the DC power source 66 through a resistor 74.

The base of a transistor 76 is connected with an output terminal 74 of a third intermediate frequency amplifier circuit through a capacitor 75, and a series circuit of the primary winding of a transformer 77 and a resistor 78 is inserted between the collector of the transistor 76 and the DC power source. Further, a parallel circuit of a capacitor 79 and resistor 80 is inserted between the emitter of the transistor 76 and the ground, and the base of the transistor 76 is grounded through a resistor 80 and connected with the DC power source through a resistor 81.

Two windings 82 and 83 are provided at the secondary side of the transformer 77. The winding 82 has one end thereof grounded and the other end thereof connected with a detector circuit having S characteristics which is constituted by capacitors 84, 85 and 86 and diodes 87 and 88. The output terminal of the S detector circuit is connected with the base of the aforementioned transistor 73 through a resistor 89. The base of the transistor 73 is grounded through a resistor 90 and connected with the DC power source through a resistor 91. The emitter of the transistor 73 is grounded through a resistor 92, and an output terminal 93 for the AFC output is taken therefrom. Connected across the winding 83 is a capacitor 94 so that there is constituted a resonant circuit adapted to resonate at the frequency of the carrier wave of a video signal. The capacitor 94 is connected with the signal input terminal of the tuning indicator circuit 59 through a detector diode 95. At the bottom of FIG. 12, there is shown the well-known AFC circuit wherein an AFC signal is supplied to the base of the transistor 73 through diodes 87 and 88.

Description will now be made of the operation of this circuit. When the switch 61 is not touched hy the hand, the transistor 67 is rendered conductive by the detection output of the diode 64 so that the collector of the transistor 67 is maintained substantially at the ground potential so that no voltage is imparted to the tuning indicator circuit 59. Therefore, the tuning indicator circuit 59 is not rendered operative. On the other hand, the base potential of the transistor 71 decreases so that this transistor 71 is in the non-conducting state. Thus, a high DC voltage is imparted to the collector of the transistor 73 through the resistor 72 so that the transistor 73 is rendered conductive. As a result, the output of the S detector circuit is obtained at the terminal 93 as an AFC voltage. If the switch 61 is touched by the hand, then the output of the CW oscillator 55 or 3.58 MC signal is passed to the ground through the switch 61, and thus no detection output is provided by the diode 64 so that the transistor 67 is rendered non-conductive. Consequently, the transistor 71 is rendered conductive. At this point, a voltage is applied to the tuning indicator circuit 59 to render the same operative so that no voltage is imparted to the collector of the transistor 73, so that no AFC voltage is available.

With the foregoing arrangement, it is possible to render the AFC circuit non-operative in an attempt to adjust the tuned state, and it is also possible to stop the tuning indicator circuit from operation during the operation of the AFC circuit, namely, under normal conditions. Thus, the adjustment of the tuned state can be easily achieved. Furthermore, the circuit can easily be switched merely by actuating only one switch.

Next, description will be made of an example for effecting the change-over between a UHF tuner and a VHF tuner. In a television receiver capable of receiving both UHF and VHF signals, there are provided knobs for adjusting the local frequencies for the UHF and VHF signals. In order to produce a tuning indication on the picture tube screen by manipulating the knob, it is necessary to supply power to a control circuit adapted to permit producing such an indication on the screen, by turning on a switch to render the control circuit operative. During reception of a UHF signal, however, if the switch for VHF signals is turned on to render the control circuit operative, then a tuning indication (vertical bar, for example) is produced on the screen. This tuning indication is not changed even if the local frequency of VHF is adjusted, because no UHF signal is received. Thus, there is the tendency that the VHF tuning point is shifted. This can also be said in the case of UHF.

It is often the case that the aforementioned switch is provided integrally with the tuning adjustment knob. In such case, the switch is inevitably turned on before the tuning adjustment knob is rotated. The aforementioned erroneous operation is often made by the operator, and therefore case should be taken to eliminate such trouble as to disturb the tuned state. The reason for such an erroneous operation is that the tuning indication bar is displayed on the screen when the operator touches the adjustment knob for a broadcast which is not being received. Thus, by such a design that such a bar is not displayed, it is less likely that the tuning knob is rotated, and therefore it is possible to prevent the tuned state from being disturbed.

The below-mentioned embodiment is adapted to achieve the foregoing purpose. Description will first be made of the circuit shown in FIG. 13, wherein the output terminal of a high frequency oscillator 96 (CW oscillator of the receiver) is connected with the anode of a diode 98 through a capacitor 97, with the anode of the diode 98 being grounded through a resistor 99 and through a switch 100. This switch 100 is a kind of capacitor, and when it is touched by a hand, the capacitance of a human body say about 50 pF is added thereto to that the capacitance of the switch is increased. The switch 100 is provided in the local oscillation frequency adjusting knob of the UHF tuner, and it is operated when the operator touches the knob in order to rotate the latter. The cathode of the diode 98 is connected with the base of a switching transistor 101. This transistor 101 is connected with a transistor 102 in Darlington fashion. Connected with the collector of the transistor 101 are a +B power source and a control circuit 103 which is adapted make such a control as to produce a tuning indication on the picture tube screen. The base of the transistor 101 is connected with one end of a switch 105 and the connection point between resistors 106 and 107 through a resistor 104. The other end of the switch 105 is grounded, the other end of the resistor 107 is connected with the negative terminal of a DC power source 108, and the other end of the resistor 106 is connected with a movable contact *a* of a change-over switch 109. The movable contact of the change-over switch 109 is also connected with +B power source, a fixed contact *b* thereof is connected with UHF tuner 110, and another fixed contact *c* is connected with VHF tuner 111.

The operation of this circuit will be described below. Assume that a UHF broadcast is now being received, with the movable contact *a* of the change-over switch 109 being engaged with the fixed contact *b* thereof. Then, the output of the high frequency oscillator 96 is divided by the capacitances of the capacitors 97 and 100 and then passed to the anode of the diode 98 so as to be smoothed out by the diode 98 and resistor 104 and thus converted into a DC voltage which in turn is imparted to the base of the transistor 101. When the switch 100 is not touched by the operator, the voltage applied to the base of the transistor 101 becomes high, whereas it becomes low when the switch is touched. The transistor 101 is rendered conductive when the high voltage is imparted to the base thereof, and when the low voltage is applied thereto, it is rendered non-conductive. Thus, when the switch 100 is not touched by the operator's hand, the transistor 101 is in the conducting state, and the transistor 102 is also in the conducting state, so that the B voltage of the B power source is not imparted to the control circuit 103. On the other hand, when the switch 100 is touched by the operator's hand, the transistors 101 and 102 are rendered non-conductive so that the B voltage is imparted to the control circuit 103 to thereby render the latter operative. Thus, the tuning can be achieved by rotating the knob having the switch 100 provided therein. The foregoing operation has been described on the assumption that the circuit arrangement provided at the left hand side of the resistor 104 did not exist. Next, explanation will be made including such circuit arrangement. The voltage appearing at the movable contact *a* of the change-over switch 109 differs depending upon whether it is connected with the UHF tuner 110 or VHF tuner 111. This is due to the fact that there is a difference in internal impedance between the tuners 110 and 111. More specifically, when the movable contact *a* is connected with the UHF tuner 110, a voltage of about 10 V is obtained thereat since the impedance of the UHF tuner is low, and when it is connected with the VHF tuner 111, a voltage of about 150 V is obtained thereat since the impedance of the VHF tuner is high. Because of these voltages, DC power source 108 and resistors 106 and 107, a voltage of about 0 V appears at the connection point *d* between the resistors 106 and 107 in the case of UHF, and a voltage of about +10 V is available thereat in the case of VHF. During reception of a UHF broadcast, since the voltage at the point *d* is about 0 V, the transistor 101 is controlled in respect of conduction and non-conduction only by the switch 100, whether the switch 105 for VHF is turned on or off.

If the movable contact *a* of the change-over switch 109 is engaged with the fixed contact *c* thereof in order to receive a VHF broadcast, then the voltage at the point *d* becomes as high as about 10 V. Consequently, the transistor 101 is rendered conductive so that the control circuit 103 is stopped from operating. In order to achieve VHF tuning, the switch 105 is turned on to render the transistor 101 non-conductive, so that the control circuit 103 is rendered operative. Thus, by rotating the local frequency adjustment knob of the VHF tuner, tuning can be achieved. Even if the switch 100 for UHF is touched when the switch 105 is not turned on, the transistor 101 is not rendered non-conductive, but remains conductive because the voltage at the point *d* is imparted to the base thereof.

As described above, in the case where a UHF broadcast is being received, any tuning indication cannot be produced even if the tuning knob for VHF is manipulated. Similarly, in the case where a VHF broadcast is being received, any tuning indication cannot be produced even if the tuning knob for UHF is manipulated. It is also possible that the switch 105 of FIG. 13 may be constructed in this manner as shown in FIG. 14. The circuit of FIG. 14 is a combination of two circuits each utilizing the switch of FIG. 13. Numeral 112 represents a switch for UHF, 113 a switch for VHF, 114 a high frequency oscillator, 115 and 116 diodes respectively, 117 and 118 switching transistors respectively, 119 a control circuit, 120 a change-over switch, and 121 a DC power source.

Assume now that the change-over switch is in the shown state, then the transistor 117 is in the conducting state, whether the switch 112 is touched or not. On the other hand, the transistor 118 is controlled according to whether the switch 113 is touched or not. That is, if the switch is touched, the transistor 118 is rendered non-conductive, so that the B voltage is imparted to the control circuit. By switching the change-over switch 120, the situation is reversed.

As described above, according to this embodiment, in the case where a UHF broadcast is being received, any tuning indication is not produced even if the tuning adjustment switch for VHF is manipulated, and in the case where a VHF broadcast is being received, any tuning indication is not produced even if the tuning adjustment switch for UHF is turned on. Thus, it is possible to eliminate the possibility that the tuning of that broadcast which is not received is disturbed.

Figures 15, 16, 17:
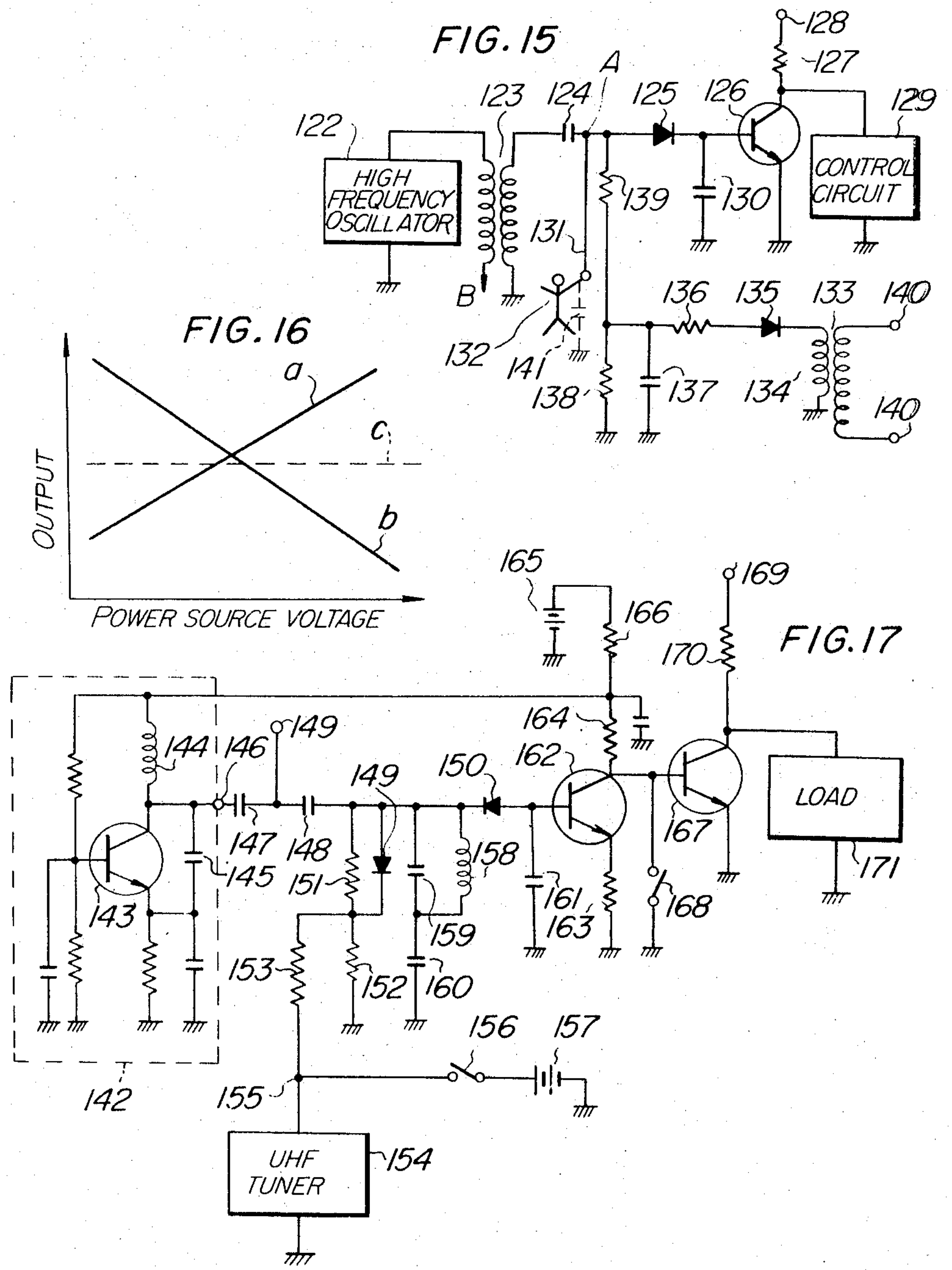
FIG. 15 is a circuit diagram showing a further embodiment of the present invention.
FIG. 16 is a view showing the characteristics of the circuit of FIG. 15 useful for explaining the same.
FIG. 17 is a circuit diagram showing a still further embodiment of the present invention.

Description will next be made of means for preventing the switching circuit from being erroneously actuated due to a change in the power source voltage. If the power source voltage varies, the output of the oscillator varies so that the output passed to the detector also varies, thus resulting in a possibility of erroneous operation. FIG. 15 shows a circuit for preventing such erroneous operation, wherein a detector diode 125 is connected with the secondary winding of an output transformer 123 of a high frequency oscillator circuit (CW oscillator) 122 through a capacitor 124, with the other end of the diode 125 being connected with the base of a switching transistor 126 which has the emitter thereof grounded and the collector thereof connected with a B power source 128 through a resistor 127 and also with the power source terminal of a control circuit 129 for tuning indication. This control circuit 129 is adapted to make such control as to produce an indication corresponding to the tuning indication on the picture tube screen. A capacitor 130 for smoothing out a detection output is inserted between the base of the transistor 126 and the ground, and the connection point A between the capacitor 124 and the diode 125 is connected with the electrode of the switch 131. This switch 131 is a contactor which is provided in a knob for adjusting the tuning condition of the television receiver. The switch 131 is provided with electrodes. If the switch 131 is touched by the operator 132, then the capacitance 141 of the human body is inserted between the aforementioned point A and the ground. A rectifier diode 135 is connected with a winding 134 for pilot lamp of a power source transformer 133, and the other end of the diode 135 is connected with a parallel circuit of a capacitor 137 and resistor 138 through a resistor. This parallel circuit has one end thereof connected with the aforementioned point A through a resistor 139 and the other end thereof grounded. Numeral 140 represents an input terminal for an AC voltage of 100 V. The aforementioned high frequency oscillator circuit 122 is a 3.58 MHz sub-carrier oscillator circuit. The operation of this circuit will be described on the assumption that the power supply circuit comprising the rectifier diode 135 is absent. When the switch 131 is not touched by the operator 132, the output of the high frequency oscillator circuit 122 is passed through the capacitor 124 so as to be detected by the diode 125 and smoothed out by the capacitor 130. Then, it is imparted to the base of the transistor 126 so that the latter is rendered conductive. Consequently, the collector potential of the transistor 126 becomes substantially equal to the ground potential. Hence, no voltage is applied to the control circuit 129, and therefore the latter is not rendered operative. Next, if the switch 131 is touched by the operator 132, then the capacitance 141 is inserted between the point A and the ground so that the high frequency signal is divided by the capacitance of the capacitor 124 and capacitance 141. Thus, by providing a sufficiently low value for the capacitor 124, the detection output of the diode 125 can be made substantially zero. In such case, the transistor 126 is rendered non-conductive so that the B voltage is imparted to the control circuit 129 to render the latter operative. At this point, by adjusting the switch 131, it is possible to achieve an accurate tuning condition while watching the indication. However, in the case of this circuit, if the output of the oscillator circuit 122 is varied with a variation in the power source voltage, the detection output of the diode 125 is also varied since it is proportional to the output of the oscillator circuit 122, and therefore there is the possibility that even if the switch 131 is not touched, a sufficient detection output is imparted to the base of the transistor 126 so that the control circuit 129 is rendered operative. In order to solve this problem, according to this embodiment, a voltage of 6.3 V induced in the pilot lamp winding 134 is rectified and smoothed out so that a negative voltage may be imparted to the anode of the diode 135. In case the power source voltage increases, the oscillation output is increased as shown at *a* in FIG. 16, whereas the aforementioned negative DC voltage is decreased as shown at *b* in FIG. 16. Because of this negative DC voltage, the detection output of the diode 125 is made to remain unchanged as shown at *c* in FIG. 16. As described above, according to this embodiment, it is possible to maintain the input voltage imparted to the base of the switching transistor constant even if the output of the oscillator circuit is varied with a change in the power source voltage. Thus, an accurate switching action can be produced by the switching transistor.

Referring now to FIG. 17, description will be made of an embodiment for effecting the switching between the UHF tuner and the VHF tuner, wherein numeral 142 represents a Colpitts oscillator circuit comprising a transistor 143 the oscillation frequency of which depends upon the inductance of an inductor 144 and capacitance of a capacitor 145. The output terminal of this oscillator 142 is connected with a capacitor 148 and switch 172 through a capacitor 147. The capacitor 148 is connected with a voltage doubler circuit comprising diodes 149 and 150. A resistor 151 is connected across the diode 149 which has the cathode thereof grounded through a resistor 152 and connected with a power source terminal 155 for the UHF tuner 154 through a resistor 153. The terminal 155 is also connected with a B power source 157 through a switch 156, which serves as a change-over switch for UHF and VHF. By closing the switch 156, the UHF tuner 154 is rendered operative, while by opening it, the VHF tuner (not shown) is rendered operative. Connected with the cathode of the diode 150 is a parallel circuit of an inductor 158 and capacitor 159 which is adapted to resonate at the oscillation frequency of the aforementioned oscillator circuit 142. The other end of the parallel circuit is grounded through a capacitor 160. This parallel circuit is provided for the purpose of preventing any erroneous operation due to an external disturbance wave. The anode of the diode 150 is grounded through a capacitor 161 and also connected with the base of a transistor 162. The emitter of this transistor 162 is grounded through a resistor 163, and the collector thereof is connected with a resistor 164 which is connected with a power source 165 through a resistor 166. Further, the collector of the transistor 162 is connected directly with the base of the transistor 167 and also grounded through a switch 168. The emitter of the transistor 167 is grounded and the collector thereof is connected with a +B power source terminal 169 through a resistor 170 and also with a load 171. These transistors 162 and 167 are controlled in respect of conduction and non-conduction by the output of the diode 150, thus controlling the operation of the load 171. The design is made such that when the transistor 162 is rendered non-conductive, the transistor 167 is rendered conductive.

During reception of a UHF broadcast, the switch 156 is closed so that a bias voltage is imparted to the cathode of the diode 149. By touching the switch 172 with the hand, the inputs to the diodes 149 and 150 are reduced so that the transistor 162 which has been in the non-conducting state is rendered conductive while the transistor 167 is rendered non-conductive. Thus, the power source voltage is imparted to the load 171 to enable the latter to start operating. At this point, if the output of the oscillator 142 is varied with a variation in the power source voltage, then the output voltage of the power source 157 is also varied in such a manner as to offset the variation of the oscillator output. Thus, the operation can be stabilized. On the other hand, during reception of a VHF broadcast, that is, when the switch 156 is in the open state, the voltage at the cathode of the diode 149 becomes zero, so that the transistor 162 is always in the non-conducting state while the transistor 167 is always in the conducting state. Thus, only when the switch 168 is closed, the load 171 is rendered operative, so that the tuning indication for the VHF broadcast can be adjusted. This circuit is characterized by the combination of the function to effect the change-over between UHF and VHF and the function to prevent any erroneous operation due to a variation in the power source voltage.

What is claimed is:

1. A tuning indication operating device for use in a television receiver, said television receiver having a manually operated tuning knob for adjusting the tuning condition of the receiver, a high frequency signal generating source having an output terminal, and a tuning indicator, said tuning indication operating device comprising

- a rectifier diode having one terminal connected to the output terminal of said high frequency generating source,
- a contactor element formed as a part of said tuning knob and connected to the other terminal of said rectifier diode, wherein when the tuning knob is touched with a hand, the capacitance of the human body is added between said contactor element and the ground,
- a resistor connected between the other terminal of said rectifier diode and the ground, said resistor and said capacitance of the human body constituting a smoothing circuit for the rectified output of said rectifier diode, only a DC voltage component being applied to the human body thereby preventing a spurious electromagnetic wave from being radiated from the human body during operation of the tuning knob,
- a blocking capacitor having one electrode connected to the other terminal of said rectifier diode,
- a detector diode having one terminal connected to the other electrode of said blocking capacitor,
- a capacitor connected between the other terminal of said detector diode and the ground, and
- a switching transistor having the base connected to the other terminal of said detector diode and having the emitter and collector connected to the ground and a DC power source respectively, said switching transistor being connected in parallel with said tuning indicator thereby to effect supply of the DC power source to said tuning indicator only when said switching transistor is turned off.

2. A tuning indicator operating device for use in a television receiver, said television receiver having manually operated tuning knobs for adjusting the tuning condition for receiving UHF and VHF channels, UHF and VHF tuners, a high frequency signal generating source having an output terminal, and a tuning indicator, said tuning indication operating device comprising a capacitor having one terminal connected to the output terminal of said high frequency signal generating source, a contactor element formed as a part of the UHF tuning knob and connected to the other terminal of said capacitor, wherein when the UHF tuning knob is touched with a hand the capacitance of the human body is added between said contactor element and the ground thereby varying the output from said high frequency signal generating source, rectifier means connected to the other terminal of said capacitor for producing a rectified DC voltage of the output of said high frequency signal source, said rectified DC voltages being varied depending on whether said contactor element is touched with a hand or not, switching means connected to said rectifier means to receive the rectified DC voltage as a first control signal for effecting switching operation, said switching means being connected in parallel with said tuning indicator thereby rendering said tuning indicator operable only when said switching means is turned off, a voltage divider circuit having a series arrangement of two resistors connected in parallel with the UHF tuner and also with the VHF tuner between a +B power source of the television receiver and ground, different DC voltages appear at the junction point of the resistors of said voltage divider circuit depending on whether said UHF tuner or VHF tuner is operating due to the fact that said UHF tuner and VHF tuner exhibit different internal impedances, and connecting means connected between said junction point of said voltage divider circuit and said switching means for applying the DC voltage appearing at the junction point of said voltage divider circuit to said switching means as a second control voltage, said switching means during UHF reception being solely controlled by the variation in the first control signal and during VHF reception being controlled solely by the second control signal without being effected by the operation of the UHF tuning knob.

3. A tuning indicator operating device for use in a television receiver, said television receiver having manually operated tuning knobs for adjusting the tuning condition for receiving UHF and VHF channels, UHF and VHF tuners, a high frequency signal generating source having an output terminal, and a tuning indicator, said tuning indication operating device comprising a capacitor having one terminal connected to the output terminal of said high frequency signal generating source, a contactor element formed as a part of the UHF tuning knob and connected to the other terminal of said capacitor, wherein when the UHF tuning knob is touched with a hand, the capacitance of the human body is added between said contactor element and the ground thereby varying the output from said high frequency signal generating source, a rectifier circuit including diodes connected to the other terminal of said capacitor for producing a rectified DC voltage of the output of said high frequency signal source, said rectified DC voltage being varied depending on whether said contactor element is touched with a hand or not, switching means connected to said rectifier circuit to receive the rectified DC voltage for effecting a switching operation, said switching means being connected in parallel with a load consisting of said tuning indicator thereby rendering said tuning indicator operable only when said switching means is turned off, a change-over switch connected between a DC power supply and said UHF tuner, said change-over switch being arranged to connect said UHF tuner to the DC power supply when said switch is closed whereas said VHF tuner is connected to the DC power supply when said switch is opened, and a bias circuit connected between an input of said rectifier circuit and the junction point of said UHF tuner and said change-over switch for applying the potential appearing at the junction point between said UHF tuner and said change-over switch to the input of said rectifier circuit as a bias voltage only when the UHF tuner is operating thereby offsetting variations in the output of said high frequency generating source due to variations in the +B power source of the television receiver.

* * * * *